United States Patent
Iwamoto et al.

(10) Patent No.: US 12,467,527 B2
(45) Date of Patent: Nov. 11, 2025

(54) DRIVE DEVICE

(71) Applicant: TOYOTA JIDOSHA KABUSHIKI KAISHA, Toyota (JP)

(72) Inventors: Masataka Iwamoto, Toyota (JP); Koichi Okuda, Toyota (JP); Atsushi Tabata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 19 days.

(21) Appl. No.: 18/581,693

(22) Filed: Feb. 20, 2024

(65) Prior Publication Data

US 2024/0410464 A1  Dec. 12, 2024

(30) Foreign Application Priority Data

Jun. 12, 2023  (JP) .................................. 2023-096110

(51) Int. Cl.
*F16H 57/04*  (2010.01)

(52) U.S. Cl.
CPC ....... *F16H 57/0426* (2013.01); *F16H 57/043* (2013.01)

(58) Field of Classification Search
CPC ............... F16H 57/0426; F16H 57/043; F16H 57/0476; F16H 57/04
See application file for complete search history.

(56) References Cited

U.S. PATENT DOCUMENTS

| 1,585,361 | A | * | 5/1926 | William | ............... F16H 57/0423 74/421 R |
|---|---|---|---|---|---|
| 3,611,832 | A | * | 10/1971 | Vollmer | ................ F16H 57/037 475/198 |
| 4,987,974 | A | * | 1/1991 | Crouch | ................... F16N 21/00 464/7 |
| 10,759,275 | B2 | * | 9/2020 | Uchida | ..................... F16H 1/28 |
| 12,233,710 | B2 | * | 2/2025 | Iwamoto | ............... B60K 17/043 |
| 2011/0039651 | A1 | * | 2/2011 | Rusteberg | ............. F16H 57/043 475/160 |
| 2023/0082913 | A1 | * | 3/2023 | Nakamatsu | ........... F16H 57/021 475/84 |
| 2024/0408959 | A1 | * | 12/2024 | Iwamoto | ............... B60K 17/043 |
| 2024/0410464 | A1 | * | 12/2024 | Iwamoto | ............. F16H 57/0495 |
| 2024/0421658 | A1 | * | 12/2024 | Ito | ....................... F16H 57/0401 |

FOREIGN PATENT DOCUMENTS

| JP | 2015-154519 A | 8/2015 |
|---|---|---|
| JP | 2020-178520 A | 10/2020 |

* cited by examiner

*Primary Examiner* — Michael A Riegelman
(74) *Attorney, Agent, or Firm* — SoraIP, Inc.

(57) ABSTRACT

The drive device includes a first motor. The drive device includes a first rotational shaft that integrally rotates with a rotor of the first motor. The drive device includes a first counter shaft that is disposed parallel to the first rotational shaft and that is also connected to the first rotational shaft via a first counter gear. The drive device includes a first transmission shaft that is disposed coaxially with the first rotational shaft and that is also connected to the first counter shaft via a second counter gear. A series of oil channels is fashioned within the first rotational shaft and the first transmission shaft.

5 Claims, 3 Drawing Sheets

DRIVE DEVICE

BACKGROUND

1. Technical Field

Technology disclosed in the present specification relates to a drive device for a vehicle.

2. Description of Related Art

Japanese Unexamined Patent Application Publication No. 2020-178520 (JP 2020-178520 A) discloses a drive device for a vehicle, including a motor and various types of gears. The motor and the various types of gears are lubricated by separate oil channels.

SUMMARY

The motor and a counter gear are lubricated by separate oil channels, and accordingly there are cases in which a total length of the oil channels becomes longer. In such cases, lubrication efficiency may deteriorate.

The drive device disclosed in the present specification is a drive device for a vehicle. The drive device includes a first motor. The drive device includes a first rotational shaft that integrally rotates with a rotor of the first motor. The drive device includes a first counter shaft that is disposed parallel to the first rotational shaft and that is also connected to the first rotational shaft via a first counter gear. The drive device includes a first transmission shaft that is disposed coaxially with the first rotational shaft and that is also connected to the first counter shaft via a second counter gear. A series of oil channels is fashioned within the first rotational shaft and the first transmission shaft.

The counter gear includes a pair of gears meshing with each other. In the above-described structure, the first rotational shaft and the first transmission shaft can make up one common oil channel. Lubricating oil can thus be supplied to the first motor, the first counter gear, and the second counter gear, using the common oil channel. The total length of the oil channel can be suppressed, and accordingly the lubrication efficiency can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
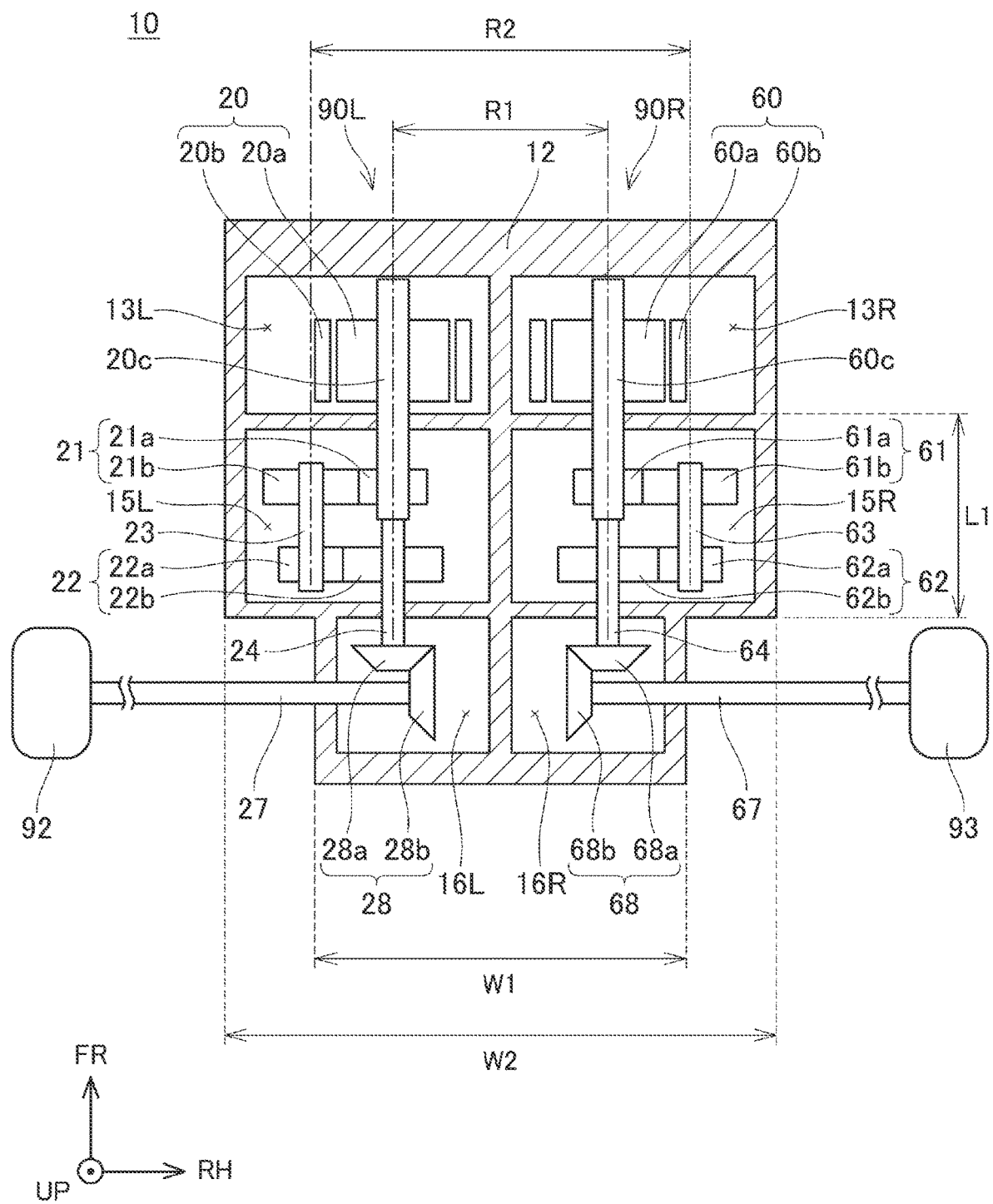
FIG. 1 is a diagram illustrating a schematic configuration of a drive device 10.

Additional features of the drive device disclosed herein are listed below.

One end of the first rotational shaft and the first transmission shaft may be inserted into the other of the first rotational shaft and the first transmission shaft.

According to the above-described configuration, the first rotational shaft and the first transmission shaft can form an oil channel without a break.

The first rotational shaft may include a first oil hole extending from the oil channel to an outer peripheral surface of the first rotational shaft.

According to the above configuration, a part of the lubricating portion flowing through the oil channel inside the first rotational shaft can be supplied to the first counter gear through the first oil hole. It is possible to appropriately lubricate the first counter gear.

The first transmission shaft may include a second oil hole extending from the oil channel to an outer peripheral surface of the first transmission shaft.

According to the above configuration, a part of the lubricating portion flowing in the oil channel inside the first transmission shaft can be supplied to the second counter gear through the second oil hole. It is possible to properly lubricate the second counter gear.

The first rotational shaft may comprise a first motor shaft, a portion of which is located within the first motor. The first rotational shaft may include a first intermediate shaft disposed coaxially with the first motor shaft and fixed to the first motor shaft. The first oil hole may be disposed in the first intermediate shaft.

According to the above configuration, a part of the lubricating portion flowing through the oil channel inside the first intermediate shaft can be supplied to the first counter gear through the first oil hole.

The drive device may comprise a second motor. The drive device may comprise a second rotational shaft that rotates integrally with the rotor of the second motor. The second rotational shaft may extend in the front-rear direction of the vehicle and be arranged parallel to the first rotational shaft. The drive device may comprise a second counter shaft arranged parallel to the second rotational shaft and connected to the second rotational shaft via a third counter gear. The drive device may comprise a second transmission shaft arranged coaxially with the second rotational shaft and connected to the second counter shaft via a fourth counter gear. The drive device may include a first drive shaft extending in the vehicle width direction, one end of which is connected to the first transmission shaft via the first hypoid gear, and the other end of which is connected to the right wheel. The drive device may include a second drive shaft extending in the vehicle width direction, one end of which is connected to the second transmission shaft via the second hypoid gear, and the other end of which is connected to the left wheel. The second rotational shaft and the second transmission shaft may form a series of oil channels therein.

According to the above configuration, it is possible to provide two independent drive systems for driving the left and right wheels, respectively. Each of the two drive systems may include an oil channel constituted by a rotational shaft and a transmission shaft. In a drive device having two independent drive systems, it is possible to suppress the total length of the oil channel.

Schematic Configuration of the Drive Device 10

FIG. 1 shows a schematic configuration of a drive device 10 according to the present embodiment. FIG. 1 is a plan view of a vehicle viewed from above. In FIG. 1, an arrow FR indicates a vehicle forward direction, an arrow RH indicates a vehicle rightward direction, and an arrow UP indicates a vehicle upward direction. The same applies to other drawings.

The drive device 10 includes a case 12. Inside the case 12, a left motor chamber 13L and a right motor chamber 13R, a left counter gear chamber 15L and a right counter gear chamber 15R, a left hypoid gear chamber 16L and a right hypoid gear chamber 16R are provided. A left-drive system 90L is disposed inside the left motor chamber 13L, the left counter gear chamber 15L, and the left hypoid gear chamber 16L. A right drive system 90R is disposed inside the right motor chamber 13R, the right counter gear chamber 15R, and the right hypoid gear chamber 16R. The left-drive system 90L and the right drive system 90R are symmetrical. Therefore, the left-drive system 90L is mainly described below in some cases.

Left-drive system 90L will be described. The first motor 20 is housed in the left motor chamber 13L. The first motor 20 includes a rotational shaft 20c extending in the front-rear direction of the vehicle. The counter shaft 23 and the transmission shaft 24 are accommodated in the left counter gear chamber 15L. The counter shaft 23 is arranged parallel to the rotational shaft 20c. The counter shaft 23 is connected to the rotational shaft 20c via a counter gear 21. The counter gear 21 includes a gear 21a fixed to the rotational shaft 20c and a gear 21b fixed to the counter shaft 23.

The transmission shaft 24 is arranged parallel to the counter shaft 23 and is coaxial with the rotational shaft 20c. The transmission shaft 24 is connected to the counter shaft 23 via a counter gear 22. The counter gear 22 includes a gear 22a fixed to the counter shaft 23 and a gear 22b fixed to the transmission shaft 24.

The left hypoid gear chamber 16L houses a drive shaft 27 extending in the vehicle-width direction. An end portion of the drive shaft 27 inside the vehicle is connected to the transmission shaft 24 via a hypoid gear 28. The hypoid gear 28 includes a drive gear 28a fixed to the transmission shaft 24 and a side gear 28b fixed to the drive shaft 27. An end portion of the drive shaft 27 on the vehicle outer side is connected to the left rear wheel 92.

The right-drive system 90R will be described. The second motor 60 is housed in the right motor chamber 13R. The second motor 60 includes a rotational shaft 60c extending in the front-rear direction of the vehicle. The counter shaft 63 and the transmission shaft 64 are accommodated in the right counter gear chamber 15R. The counter shaft 63 is arranged parallel to the rotational shaft 60c. The counter shaft 63 is connected to the rotational shaft 60c via a counter gear 61. The counter gear 61 includes a gear 61a fixed to the rotational shaft 60c and a gear 61b fixed to the counter shaft 63.

The transmission shaft 64 is arranged parallel to the counter shaft 63 and is coaxial with the rotational shaft 60c. The transmission shaft 64 is connected to the counter shaft 63 via a counter gear 62. The counter gear 62 includes a gear 62a fixed to the counter shaft 63 and a gear 62b fixed to the transmission shaft 64.

A drive shaft 67 extending in the vehicle-width direction is accommodated in the right hypoid gear chamber 16R. An end portion of the drive shaft 67 inside the vehicle is connected to the transmission shaft 64 via a hypoid gear 68. The hypoid gear 68 includes a drive gear 68a fixed to the transmission shaft 64 and a side gear 68b fixed to the drive shaft 67. An end portion of the drive shaft 67 on the vehicle outer side is connected to the right rear wheel 93.

Positional Relationship

In FIG. 1, the area between the counter shafts 23 and 63 in the vehicle width direction is defined as the area R2. The rotational shaft 20c and 60c are located in the area R2. Transmission shafts 24 and 64 are also located in the area R2.

In FIG. 1, the area between the transmission shafts 24 and 64 is defined as the area R1 in the width direction of the vehicle. The side gears 28b and 68b are located in the area R1.

A vehicle width-direction width of the case 12 defining the left hypoid gear chamber 16L and the right hypoid gear chamber 16R is defined as a width W1. Further, a width in the vehicle width direction of the case 12 defining the left counter gear chamber 15L and the right counter gear chamber 15R is defined as a width W2. The width W1 is smaller than the width W2.

Specific Configuration of the Left-Drive System 90L

Figure 2:
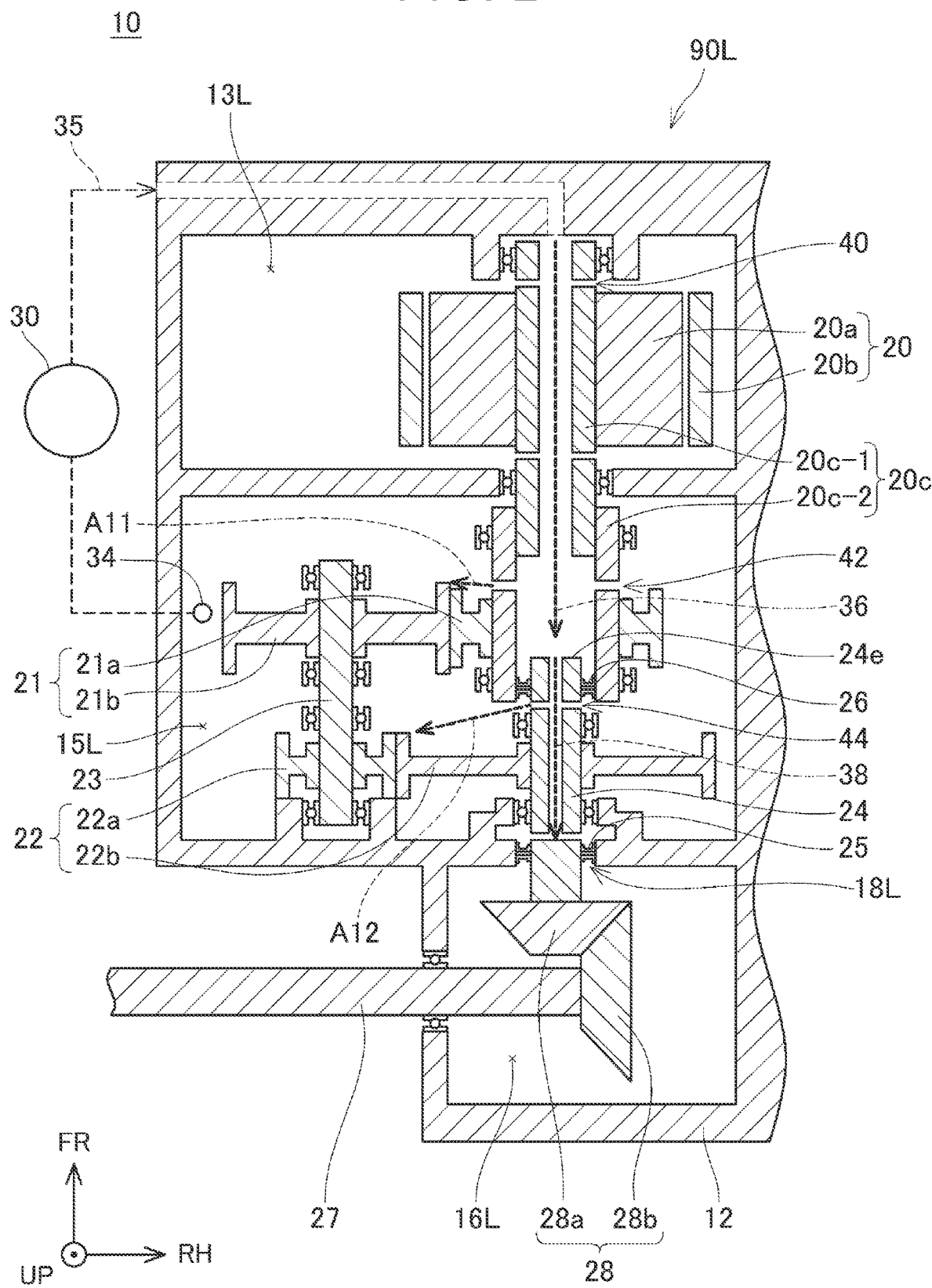
FIG. 2 is an enlarged cross-sectional view of the left-drive system 90L.

A specific configuration of the left-drive system 90L will be described with reference to FIG. 2. FIG. 2 is an enlarged cross-sectional view of the left-drive system 90L. The first motor 20 includes a rotor 20a and a stator 20b. The stator 20b is disposed around the rotor 20a. The rotor 20a has a rotational shaft 20c. The rotational shaft 20c has a motor shaft 20c-1 and an intermediate shaft 20c-2. The motor shaft 20c-1 and the intermediate shaft 20c-2 each have a cylindrical configuration. That is, the rotational shaft 20c is hollow. A portion of the motor shaft 20c-1 is located within the first motor 20. The rear end of the motor shaft 20c-1 is inserted into the distal end of the intermediate shaft 20c-2. The motor shaft 20c-1 is fixed to the intermediate shaft 20c-2 by spline-fitting.

The counter shaft 23 and the transmission shaft 24 are rotatably indicated by bearings provided in the case 12. The transmission shaft 24 is disposed behind the rotational shaft 20c. The transmission shaft 24 extends coaxially with the rotational shaft 20c. More specifically, the central axis of the transmission shaft 24 coincides with an extension of the central axis of the rotational shaft 20c. The front end 24e of the transmission shaft 24 is inserted into the central hole of the rotational shaft 20c from the rear end of the rotational shaft 20c. A gap between the outer peripheral surface of the transmission shaft 24 and the inner peripheral surface of the rotational shaft 20c is sealed by an oil seal 26.

The rear end of the transmission shaft 24 extends from the left counter gear chamber 15L to the left hypoid gear chamber 16L through the through hole 18L. A gap between the outer peripheral surface of the transmission shaft 24 and the inner peripheral surface of the through-hole 18L is sealed by an oil seal 25.

The drive device 10 includes an oil circulation oil channel 35. An oil pump 30 is provided in the oil circulation oil channel 35. An upstream end of the oil circulation oil channel 35 is connected to the oil suction port 34. The oil suction port 34 is disposed at the bottom of the left counter gear chamber 15L. As described above, the rotational shaft 20c has a cylindrical configuration. A shaft oil channel 36 is formed by the central hole of the rotational shaft 20c (see dotted arrows). A downstream end of the oil circulation oil channel 35 is connected to a front end of the shaft oil channel 36.

The motor shaft 20c-1 is provided with a plurality of motor oil holes 40. The motor oil hole 40 extends from the shaft oil channel 36 to the outer peripheral surface of the rotational shaft 20c. The intermediate shaft 20c-2 is provided with a plurality of first oil holes 42. The first oil hole 42 extends from the shaft oil channel 36 to the outer peripheral surface of the intermediate shaft 20c-2.

Inside the transmission shaft 24, a shaft oil channel 38 extending along its central axis is provided (see dotted arrows). A front end of the shaft oil channel 38 is connected to the shaft oil channel 36. That is, the shaft oil channel 36 of the rotational shaft 20c and the shaft oil channel 38 of the transmission shaft 24 form a common oil channel. The transmission shaft 24 is provided with a plurality of second oil holes 44. The second oil hole 44 extends from the shaft oil channel 38 to the outer peripheral surface of the transmission shaft 24.

During operation of the first motor 20, the oil pump 30 operates. When the oil pump 30 is operated, the lubricating oil stored in the bottom portion of the left counter gear chamber 15L is supplied to the shaft oil channel 36 in the rotational shaft 20c via the oil suction port 34 and the oil circulation oil channel 35. The lubricating oil flows rearward through the shaft oil channel 36. The first motor 20 is cooled by the lubricating oil flowing in the shaft oil channel 36. A portion of the lubricating oil in the shaft oil channel 36 is discharged from the motor oil hole 40 and the first oil hole 42. The first motor 20 is lubricated by the lubricating oil discharged from the motor oil hole 40. As indicated by the dotted arrow A11, the counter gear 21 is lubricated and cooled by the lubricating oil discharged from the first oil hole 42.

The lubricating oil flowing to the rear end in the shaft oil channel 36 flows into the shaft oil channel 38 in the transmission shaft 24. A portion of the lubricating oil in the shaft oil channel 38 is discharged from the second oil hole 44. As indicated by the dotted arrow A12, the counter gear 22 is lubricated and cooled by the lubricating oil discharged from the second oil hole 44.

Specific Configuration of the Right-Drive System 90R

Figure 3:
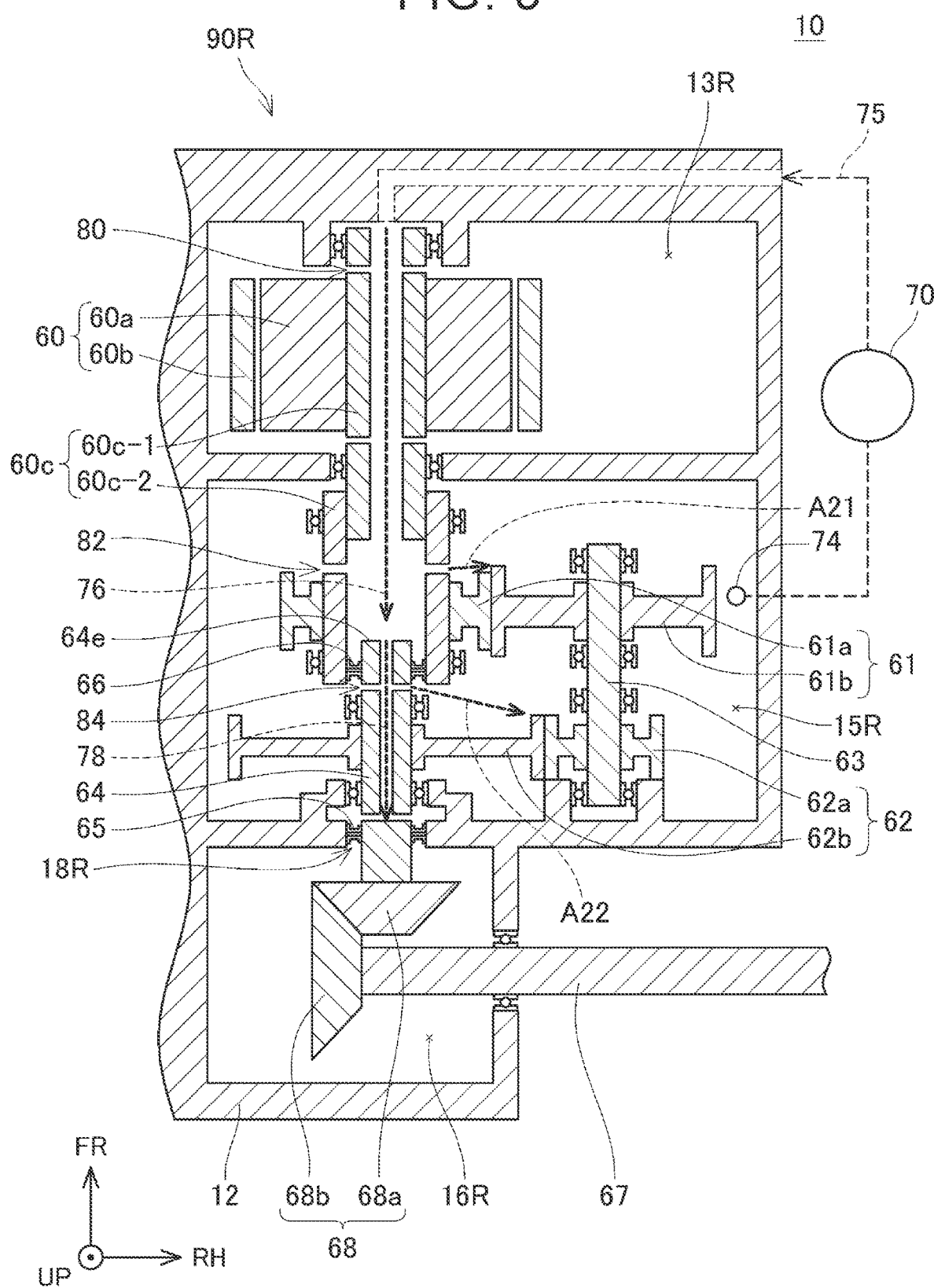
FIG. 3 is an enlarged cross-sectional view of right-drive system 90R.

A specific configuration of the right-drive system 90R will be described with reference to FIG. 3. FIG. 3 is an enlarged cross-sectional view of the right-drive system 90R. The right drive system 90R of FIG. 3 is symmetrical to the left-drive system 90L of FIG. 2. Therefore, the configuration of the right drive system 90R is the same as the configuration of the left-drive system 90L described above.

That is, the right-drive system 90R includes a second motor 60, a motor shaft 60c-1, an intermediate shaft 60c-2, counter gears 61 and 62, a counter shaft 63, a transmission shaft 64, oil seals 65 and 66, a drive shaft 67, and a hypoid gear 68. The right drive system 90R includes an oil pump 70, an oil suction port 74, an oil circulation oil channel 75, shaft oil channels 76 and 78, a motor oil hole 80, a first oil hole 82, and a second oil hole 84. The counter gear 61 is lubricated and cooled by the lubricating oil discharged from the first oil hole 82 (see the dotted-line arrow A21). In addition, the counter gear 62 is lubricated and cooled by the lubricating oil discharged from the second oil hole 84 (see the dotted-line arrow A22). Note that the specific contents of the respective members included in the right drive system 90R are the same as the contents of the left-drive system 90L described above, and thus detailed explanation thereof is omitted.

Effects

In the left-drive system 90L of the drive device 10 of the present embodiment, the shaft oil channel 36 of the rotational shaft 20c and the shaft oil channel 38 of the transmission shaft 24 can constitute a common oil channel. That is, the lubricating oil can be supplied to the shaft oil channel 38 via the shaft oil channel 36. Thus, the lubricating oil can be supplied to the first motor 20 and the counter gears 21 and 22 by using a common oil channel. As compared with the case where the first motor 20 and the counter gears 21 and 22 are lubricated using separate oil channels, the total length of the oil channels can be suppressed. It is possible to improve the lubrication efficiency.

Similarly, in the right-drive system 90R of the drive device 10 of the present embodiment, the shaft oil channel 76 of the rotational shaft 60c and the shaft oil channel 78 of the transmission shaft 64 can constitute a common oil channel. Then, the lubricating oil can be supplied to the second motor 60 and the counter gears 61 and 62 by using a common oil channel. The total length of the oil channel can be suppressed, and accordingly the lubrication efficiency can be improved.

Although the embodiments have been described in detail above, the embodiments are merely examples and do not limit the scope of claims. The techniques described in the claims include various modifications and alterations of the specific examples illustrated above. The technical elements described in this specification or in the drawings may be used alone or in various combinations, and are not limited to the combinations described in the claims at the time of filing. Further, the technology illustrated in the present specification or the drawings achieves a plurality of objects at the same time, and has technical usefulness by achieving one of the objects.

Modifications

The transmission shafts 24 and 64 may be located anywhere within the regional R2 between the counter shafts 23 and 63. For example, in a top view, the transmission shaft 24 of the left-drive system 90L may be disposed between the rotational shaft 20c and the counter shaft 23. The transmission shaft 64 of the right-drive system 90R may be disposed between the rotational shaft 60c and the counter shaft 63. Accordingly, the length L1 of the counter gear compartment in the vehicle front-rear direction can be reduced.

Each of the rotational shaft 20c and 60c is not limited to a form in which a plurality of shafts are fitted, and may be, for example, a single shaft.

The front end of each of the transmission shafts 24 and 64 may not be inserted into the central bore of each of the rotational shaft 20c and 60c. Here, the front end of each of the transmission shafts 24 and 64 and the rear end of each of the rotational shaft 20c and 60c may be spaced apart.

Each of the rear ends of the rotational shafts 20c and 60c may be inserted into a central bore of each of the front ends of the transmission shafts 24 and 64.

The configuration is not limited to a configuration including two independent left-drive system 90L and right-drive system 90R. The technology of the present specification can also be applied to a configuration in which a common single drive system is used to drive the left and right wheels.

It may be a form that does not include hypoid gears 28 and 68. The rotational shaft 20c and 60c may then extend widthwise of the vehicle.

The rotational shaft 20c is an exemplary first rotational shaft. The counter gear 21 is an example of a first counter gear. The counter shaft 23 is an example of a first counter shaft. The counter gear 22 is an example of a second counter gear. The transmission shaft 24 is an example of a first transmission shaft. The counter gear 61 is an example of a third counter gear. The counter shaft 63 is an example of a second counter shaft. The counter gear 62 is an example of a fourth counter gear. The transmission shaft 64 is an example of a second transmission shaft.

What is claimed is:
1. A drive device for a vehicle, the drive device comprising:
a first motor;
a first rotational shaft that integrally rotates with a rotor of the first motor;

a first counter shaft that is disposed parallel to the first rotational shaft and that is also connected to the first rotational shaft via a first counter gear;

a first transmission shaft that is disposed coaxially with the first rotational shaft and that is also connected to the first counter shaft via a second counter gear; and a counter gear chamber, wherein;

a first oil channel that is a series of oil channels fashioned within the first rotational shaft and the first transmission shaft;

the counter gear chamber houses a part of the first rotational shaft, the first transmission shaft, the first counter gear, the second counter gear, and the first counter shaft;

the first rotational shaft includes a first oil hole in the part housed within the counter gear chamber, the first oil hole extending from the first oil channel to an outer peripheral surface of the first rotational shaft;

the first oil hole is provided closer to the first counter gear than to the second counter gear in an axial direction of the first rotation shaft;

the first transmission shaft includes a second oil hole extending from the first oil channel to an outer peripheral surface of the first transmission shaft;

the second oil hole is provided in the first transmission shaft at a position between the first counter gear and the second counter gear; and the first oil hole and the second oil hole open toward the counter gear chamber.

2. The drive device according to claim 1, wherein one end of one of the first rotational shaft and the first transmission shaft is inserted inside of another of the first rotational shaft and the first transmission shaft.

3. The drive device according to claim 1, wherein:

the first rotational shaft includes
 a first motor shaft, a portion of which is situated in the first motor, and
 a first intermediate shaft that is disposed coaxially with the first motor shaft and fixed to the first motor shaft; and the first oil hole is arranged in the first intermediate shaft.

4. The drive device according to claim 1, further comprising a motor chamber that houses the first motor, wherein:

a part of the first rotational shaft is located within the first motor;

the first rotational shaft includes a third oil hole on an opposite side of the first transmission shaft via the first motor; and the third oil hole extends from the first oil channel to an outer peripheral surface of the first rotational shaft and open toward the motor chamber.

5. The drive device according to claim 1, further comprising a second oil channel, wherein:

one end of the second oil channel is connected to the counter gear chamber;

the other end of the second oil channel is connected to one end of the first oil channel; and the one end of the first oil channels is on a side of the first rotational shaft.

* * * * *